(12) United States Patent
Jang et al.

(10) Patent No.: US 12,411,401 B2
(45) Date of Patent: Sep. 9, 2025

(54) SCREEN FOR PROJECTOR AND MANUFACTURING METHOD THEREOF

(71) Applicant: SAMSUNG ELECTRONICS CO., LTD., Suwon-si (KR)

(72) Inventors: Naewon Jang, Suwon-si (KR); Youngchol Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 102 days.

(21) Appl. No.: 18/214,123

(22) Filed: Jun. 26, 2023

(65) Prior Publication Data

US 2023/0333458 A1 Oct. 19, 2023

Related U.S. Application Data

(63) Continuation of application No. PCT/KR2021/019637, filed on Dec. 22, 2021.

(30) Foreign Application Priority Data

Jan. 5, 2021 (KR) .................. 10-2021-0001093

(51) Int. Cl.
*G03B 21/60* (2014.01)
*G02B 5/00* (2006.01)
*G03B 21/56* (2006.01)
*G03B 21/602* (2014.01)
(Continued)

(52) U.S. Cl.
CPC ............. *G03B 21/60* (2013.01); *G02B 5/003* (2013.01); *G03B 21/56* (2013.01); *G03B 21/602* (2013.01); *G03B 21/604* (2013.01); *G03B 21/625* (2013.01)

(58) Field of Classification Search
CPC ...... G03B 21/60; G03B 21/602; G03B 21/56; G03B 21/625; G03B 21/604; G02B 5/003
(Continued)

(56) References Cited

U.S. PATENT DOCUMENTS 7,035,006 B2 *  4/2006  Umeya ................ G02B 5/0284
                                                    359/10
8,711,475 B2 *  4/2014  Jeon ...................... G03B 21/60
                                                    359/449
(Continued)

FOREIGN PATENT DOCUMENTS

JP         9-34015 A      2/1997
JP      2005-114953 A     4/2005
(Continued)

OTHER PUBLICATIONS

Written Opinion (PCT/ISA/237) issued Apr. 6, 2022 by the International Searching Authority in International Application No. PCT/KR2021/019637.
(Continued)

*Primary Examiner* — Stephanie E Bloss
*Assistant Examiner* — Kevin C Butler
(74) *Attorney, Agent, or Firm* — Sughrue Mion, PLLC

(57) ABSTRACT

A projector screen includes: a light absorbing layer configured to absorb light; a plurality of reflectors provided on a front surface of the light absorbing layer and spaced apart from each other at regular intervals, wherein the plurality of reflectors are inclined with respect to the light absorbing layer and are configured to reflect light; and a transparent layer disposed above the plurality of reflectors and configured to transmit light therethrough, wherein the transparent layer may include a front surface that is flat and parallel to the light absorbing layer, and a rear surface having a plurality of grooves having a shape corresponding to the plurality of reflectors, wherein the plurality of reflectors are provided in the plurality of grooves of the transparent layer, and the rear surface of the transparent layer contacts the front surface of the light absorbing layer.

18 Claims, 24 Drawing Sheets

(51) Int. Cl.
*G03B 21/604* (2014.01)
*G03B 21/625* (2014.01)

(58) Field of Classification Search
USPC .......................................................... 359/459
See application file for complete search history.

(56) References Cited

U.S. PATENT DOCUMENTS

| | | | |
|---|---|---|---|
| 9,354,500 B2 * | 5/2016 | Kim | G02B 30/27 |
| 2014/0036359 A1 * | 2/2014 | Jeon | G03B 21/60 |
| | | | 427/163.3 |
| 2023/0333458 A1 * | 10/2023 | Jang | G02B 5/003 |

FOREIGN PATENT DOCUMENTS

| | | | | | |
|---|---|---|---|---|---|
| JP | 2010-204572 | A | | 9/2010 | |
| JP | 2014115581 | A | * | 6/2014 | |
| JP | 2015227971 | A | * | 12/2015 | |
| JP | 2016075846 | A | * | 5/2016 | |
| JP | 6536003 | B2 | * | 7/2019 | |
| KR | 1998-033106 | U | | 9/1998 | |
| KR | 10-0294218 | B1 | | 7/2001 | |
| KR | 10-2004-0007333 | A | | 1/2004 | |
| KR | 10-2012-0069180 | A | | 6/2012 | |
| KR | 20120069180 | A | * | 6/2012 | ............. G03B 21/56 |
| KR | 10-2013-0022987 | A | | 3/2013 | |
| KR | 20130022987 | A | * | 3/2013 | ............... G02B 5/00 |
| KR | 10-2014-0119986 | A | | 10/2014 | |

OTHER PUBLICATIONS

International Search Report (PCT/ISA/210) issued Apr. 6, 2022 by the International Searching Authority in International Application No. PCT/KR2021/019637.

* cited by examiner

SCREEN FOR PROJECTOR AND MANUFACTURING METHOD THEREOF

CROSS-REFERENCE TO RELATED APPLICATIONS

This application is by-pass continuation application of International Application No. PCT/KR2021/019637, filed on Dec. 22, 2021, which based on and claims priority to Korean Patent Application No. 10-2021-0001093, filed on Jan. 5, 2021, in the Korean Intellectual Property Office, the disclosures of which are incorporated by reference herein in their entireties.

BACKGROUND

1. Field

The disclosure relates to a projector screen and a method of manufacturing the projector screen.

2. Description of Related Art

When a projector projects image light onto a screen, the user may see an image through the image light reflected on the screen.

Because the incident angle and reflection angle of the image light are symmetrical, in the case of a general projector that projects image light onto the screen at a long distance, the image light projected from the projector may be reflected on the screen and transmitted to the user.

However, in the case of a short throw projector that projects image light onto the screen at a short distance, the incident angle of the image light incident on the screen is larger than that of the general projector.

When the incident angle of the image light is large, the reflection angle is also large, so most of the image light is reflected toward the ceiling instead of toward the user. Thus, the user sees a dark image.

In attempt to solve this problem, a screen for the short throw projector has been developed and used.

FIG. 1 is a cross-sectional view illustrating a projector screen according to the related art.

Referring to FIG. 1, the projector screen 100 according to the related art includes an absorption pattern layer 101, a plurality of reflective surfaces 103, and a transparent layer 105.

The absorption pattern layer 101 is formed to absorb external light G coming from the ceiling and not reflect it toward the user. On the front surface of the absorption pattern layer 101, a plurality of protrusions 102 having an isosceles triangular cross-section are continuously formed. Therefore, the external light G is incident to the absorption pattern layer 101 through the upper inclined surfaces of the plurality of protrusions 102 and is not reflected to the outside.

The plurality of reflective surfaces 103 are formed to reflect image light L emitted from the projector disposed below the projector screen 100 toward the user. The plurality of reflective surfaces 103 are formed on lower inclined surfaces of the plurality of protrusions 102 of the absorption pattern layer 101.

The plurality of reflective surfaces 103 may be formed by depositing a reflective material on the lower inclined surfaces of the plurality of protrusions 102 by sputtering or by coating the lower inclined surfaces thereof with white ink.

The transparent layer 105 is disposed in front of the absorption pattern layer 101 and the plurality of reflective surfaces 103 to form the front surface of the screen 100, and transmits external light G and image light L.

Accordingly, the projector screen 100 according to the related art having the structure shown in FIG. 1 may reflect image light L incident from the lower side toward the user and absorb external light G incident from the ceiling.

However, because the projector screen 100 according to the related art as described above is formed by sputtering a reflective material or coating white ink on the lower inclined surfaces of the plurality of protrusions 102 of the absorption pattern layer 101, the manufacturing cost is high.

In addition, depending on the precision of the plurality of reflective surfaces 103 formed on the lower inclined surface of the plurality of protrusions 102 of the absorption pattern layer 101, the black level by external light G may be increased. When the black level is high, the bright-room contrast ratio is reduced, resulting in deterioration of image quality.

SUMMARY

Provided is a projector screen that may improve a contrast ratio in a bright room with a low manufacturing cost.

In addition, provided is a method of manufacturing a projector screen that may improve a contrast ratio in a bright room with a low manufacturing cost.

According to an aspect of the disclosure, a projector screen includes: a light absorbing layer configured to absorb light; a plurality of reflectors provided on a front surface of the light absorbing layer and spaced apart from each other at regular intervals, wherein the plurality of reflectors are inclined with respect to the light absorbing layer and are configured to reflect light; and a transparent layer disposed above the plurality of reflectors and configured to transmit light therethrough, wherein the transparent layer may include a front surface that is flat and parallel to the light absorbing layer, and a rear surface having a plurality of grooves having a shape corresponding to the plurality of reflectors, wherein the plurality of reflectors are provided in the plurality of grooves of the transparent layer, and the rear surface of the transparent layer contacts the front surface of the light absorbing layer.

A cross-section of each reflector of the plurality of reflectors may have a shape of a right triangle, and each reflector of the plurality of reflectors may include a rear surface that contacts the light absorbing layer and may be a base of the shape of the right triangle.

A cross-section of each reflector of the plurality of reflectors may have a shape of a trapezoid, and each reflector of the plurality of reflectors may include a rear surface that contacts the light absorbing layer and may be a side of the shape of the trapezoid.

Each reflector of the plurality of reflectors may include a reflective surface inclined with respect to the light absorbing layer and configured to reflect light, and a ratio of a base of the reflective surface to a height of the reflective surface may be at least 0.5.

The plurality of reflectors may include white beads.

The transparent layer may include a transparent urethane resin.

The projector screen may further include a base film that may be disposed on the front surface of the transparent layer and may be transparent.

The projector screen may further include a low reflection layer disposed on a front surface of the base film.

The projector screen may further include a color absorption layer disposed on a front surface of the low reflection layer.

According to an aspect of the disclosure, a method of manufacturing a projector screen, includes: forming a transparent layer on a first surface of a base film; forming a plurality of grooves on an upper surface of the transparent layer, wherein each groove of the plurality of grooves has a right triangle cross-section and the plurality of grooves are spaced apart from each other at regular intervals; filling the plurality of grooves with at least one of white beads or white resin; and disposing a light absorbing layer on the upper surface of the transparent layer in which the plurality of grooves are formed.

Each groove of the plurality of grooves may have a ratio of an opening width to a height may be at least 0.5.

The forming the plurality of grooves on the upper surface of the transparent layer may include forming the plurality of grooves on the upper surface of the transparent layer by performing an imprinting process.

The method may further include: forming a low reflection layer on a second surface of the base film that may be different than the first surface; and forming a color absorption layer on a surface of the low reflection layer that does not contact with the base film.

According to an aspect of the disclosure, a method of manufacturing a projector screen, includes: forming a transparent layer on a surface of a base film; forming a plurality of grooves on an upper surface of the transparent layer, wherein each groove of the plurality of grooves has a rectangular cross-section and the plurality of grooves are spaced apart from each other at regular intervals; filling the plurality of grooves with white beads; molding the transparent layer by using a roller such that the plurality of grooves filled with the white beads are inclined with respect to the base film; and disposing a light absorbing layer on the upper surface of the transparent layer molded by the roller.

Each groove of the plurality of grooves having a rectangular cross-section inclined in the molding the transparent layer may be formed so that a ratio of a base of an inclined side to a height of the inclined side is at least 0.5.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Various embodiments described below are shown by way of example to assist understanding of the disclosure, and it should be understood that the disclosure may be variously modified and implemented differently from the embodiments described herein. However, in the following description of the disclosure, when it is determined that a detailed description of a related known function or components may unnecessarily obscure the gist of the disclosure, the detailed description and specific illustration thereof will be omitted. Further, in the accompanying drawings, the dimensions of some components may be arbitrarily exaggerated and not drawn to scale in order to aid understanding of the disclosure.

The terms 'first', 'second', etc. may be used to describe diverse components, but the components are not limited by the terms. The terms may only be used to distinguish one component from the others. For example, without departing from the scope of the disclosure, a first component may be referred to as a second component, and similarly, a second component may also be referred to as a first component.

The terms used in embodiments of the disclosure may be construed as commonly known to those skilled in the art unless otherwise defined.

Further, the terms 'leading end', 'rear end', 'upper side', 'lower side', 'top end', 'bottom end', etc. used in the disclosure are defined with reference to the drawings. However, the shape and position of each component are not limited by the terms.

Hereinafter, a projector screen according to an embodiment of the disclosure will be described in detail with reference to the accompanying drawings.

Figure 1:
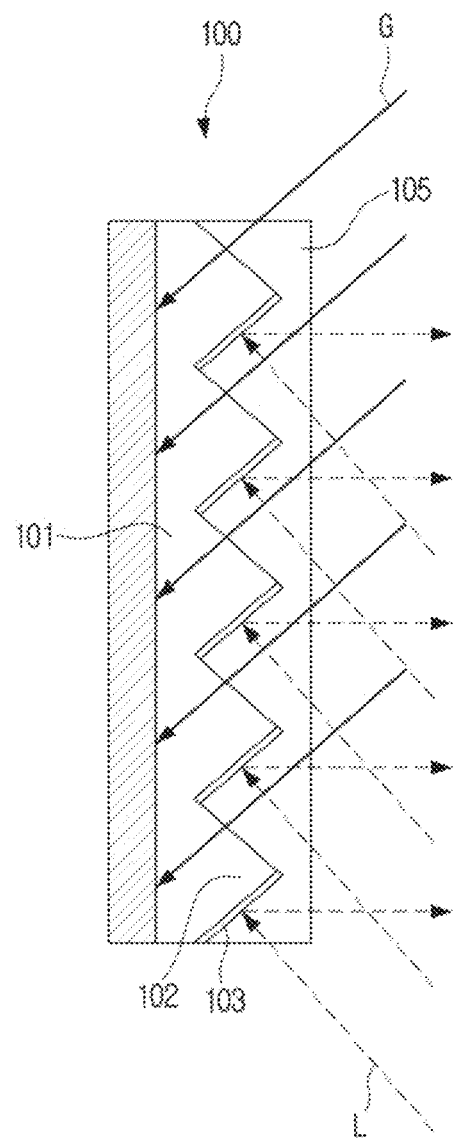
FIG. 1 is a cross-sectional view illustrating a projector screen according to the related art.
Figure 2:
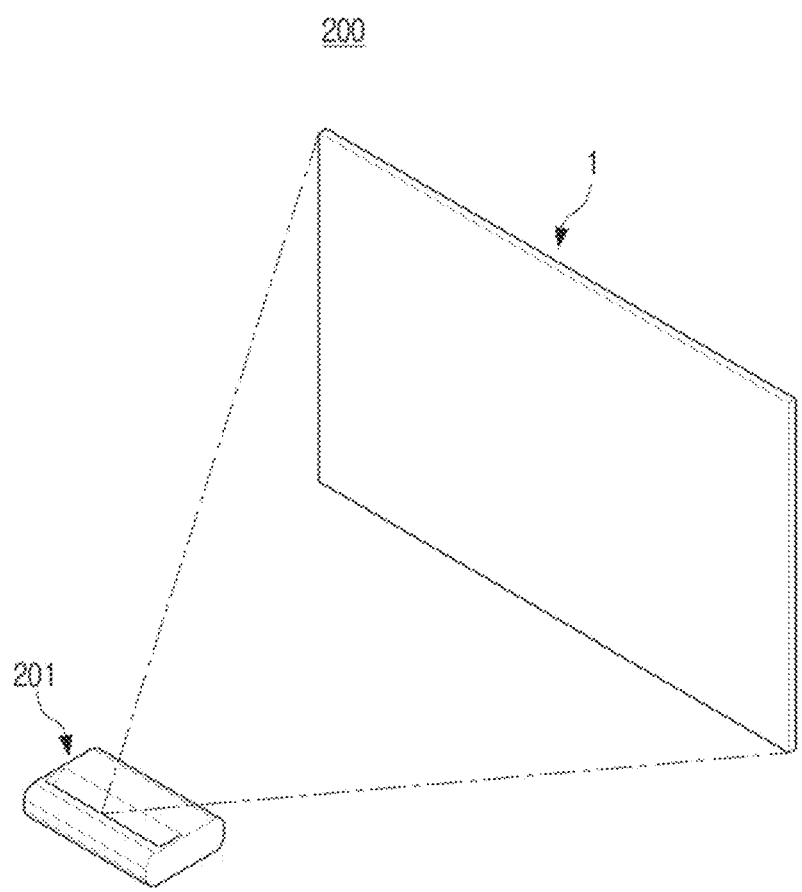
FIG. 2 is a view illustrating a display apparatus including a projector screen according to an embodiment of the disclosure.

FIG. 2 is a view illustrating a display apparatus 200 including a projector screen 1 according to an embodiment of the disclosure.

Referring to FIG. 2, a display apparatus 200 may include a projector 201 and a projector screen 1 according to an embodiment of the disclosure.

The projector 201 projects image light toward the projector screen 1. The projector 201 may be positioned below the center in the vertical direction of the projector screen 1.

The projector screen 1 reflects image light projected from the projector 201. The projector screen 1 may be formed to absorb light incident from the upper side and reflect image light projected from the projector 201 disposed at the lower side of the projector screen 1 toward the user.

Hereinafter, the projector screen 1 according to an embodiment of the disclosure will be described in detail with reference to FIG. 3 and FIG. 4.

Figure 3:
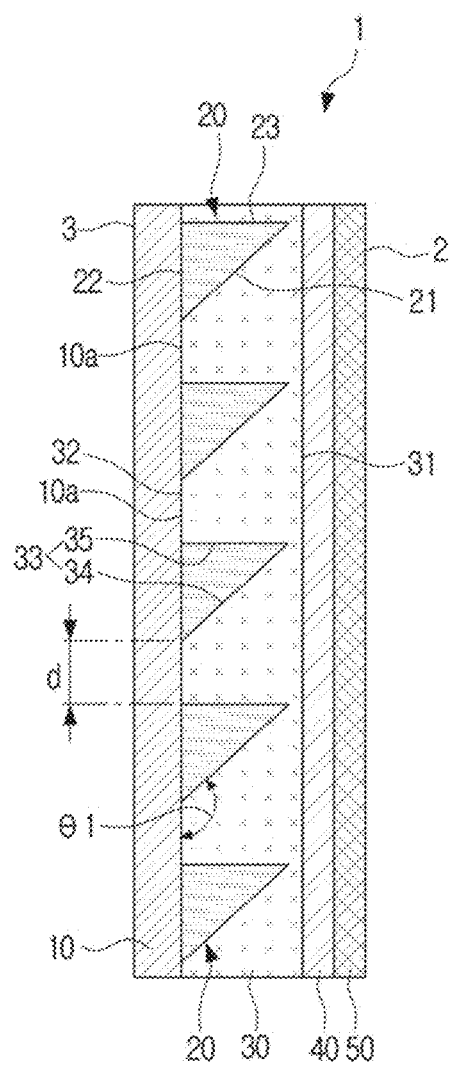
FIG. 3 is a cross-sectional view illustrating a projector screen according to an embodiment of the disclosure.

FIG. 3 is a cross-sectional view illustrating a projector screen 1 according to an embodiment of the disclosure. FIG. 4 is a partially enlarged cross-sectional view illustrating a reflector, of reflectors 20, of a projector screen 1 according to an embodiment of the disclosure.

Referring to FIG. 3, the projector screen 1 according to an embodiment of the disclosure may include a light absorbing layer 10, a plurality of reflectors 20, and a transparent layer 30.

The light absorbing layer 10 is a layer that absorbs incident light and may be formed of a black resin film. For example, a black polyethylene terephthalate (PET) film may be used as the light absorbing layer 10.

The rear surface of the light absorbing layer 10 may form the rear surface 3 of the projector screen 1.

The plurality of reflectors 20 may be formed to reflect incident light toward the user. For example, the plurality of reflectors 20 may be formed to reflect light incident from the lower side in a direction perpendicular to the front surface 2 of the projector screen 1. Here, the lower side refers to a place lower than the center in the vertical direction of the projector screen 1.

The plurality of reflectors 20 may be disposed on the front surface of the light absorbing layer 10 at regular intervals. In other words, the plurality of reflectors 20 are disposed to be spaced apart from each other at regular intervals in the vertical direction of the screen 1, and the light absorbing layer 10 may be exposed between the plurality of reflectors 20. The distance d between the plurality of reflectors 20, that is, the distance between two adjacent reflectors 20 may be set such that image light incident from the projector 201 is reflected by the reflectors 20 without being directly incident on the exposed portions 10*a* of the light absorbing layer 10.

In addition, the plurality of reflectors 20 may be formed to be inclined at a predetermined angle with respect to the light absorbing layer 10. In other words, the plurality of reflectors 20 may be formed such that the reflective surface 21 that reflects light is inclined at an inclination angle θ1 with respect to the light absorbing layer 10. At this time, the inclination angle θ1 of the reflective surface 21 may be determined to reflect the light incident from the lower side in a direction perpendicular to the front surface 2 of the screen 1.

For example, each of the plurality of reflectors 20 may be formed in a column shape having a cross-section of a right triangle. The inclined surface of the reflector 20 forms the reflective surface 21 that reflects image light projected from the projector 201 (see FIG. 2), and the rear surface 22 of the reflectors 20 may be attached to the light absorbing layer 10.

The reflective surface 21 may be formed to be inclined upward with respect to the light absorbing layer 10. In other words, the reflective surface 21 may be formed to form an obtuse angle with respect to the light absorbing layer 10.

The amount of light reflection that the reflective surfaces 21 of the plurality of reflectors 20 reflect image light incident from the lower side to the front of the screen 1 may vary according to the inclination angle θ1 of the reflective surfaces 21. In the case of this embodiment, when the ratio of the base of the reflective surface 21 to the height of the reflective surface 21 is 0.5 or more, an appropriate amount of reflection may be obtained.

Figure 4:
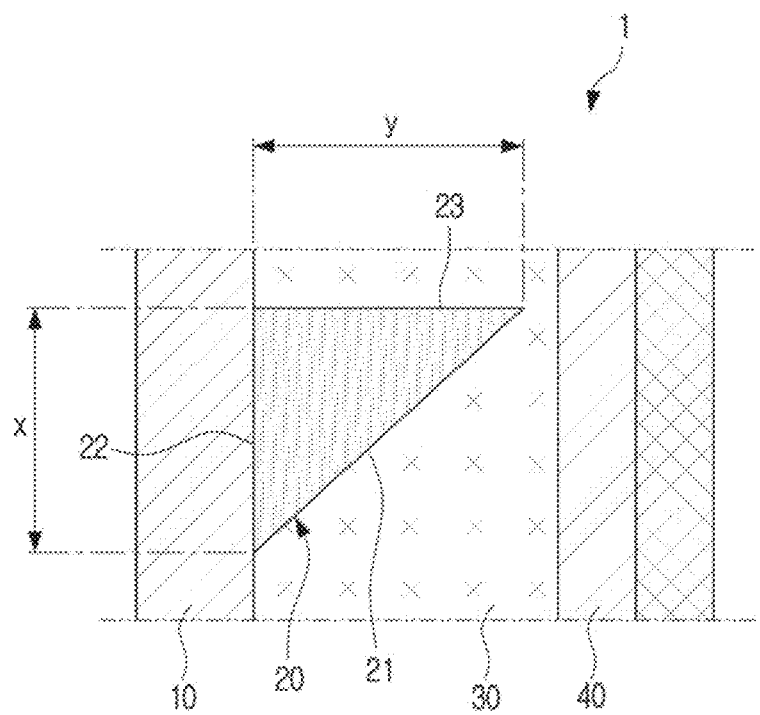
FIG. 4 is a partially enlarged cross-sectional view illustrating a reflector of a projector screen according to an embodiment of the disclosure.

Referring to FIG. 4, the base of the reflective surface 21 refers to the length x of the lower surface 22 of the reflector 20 that contacts the light absorbing layer 10, and the height of the reflective surface 21 refers to the height y from the light absorbing layer 10 to the highest point of the reflective surface 21. Accordingly, the reflective surface 21 of the reflector 20 may have an ideal optical structure when $x/y \geq 0.5$.

On the other hand, the ratio of the base x of the reflective surface 21 to the height y of the reflective surface 21 may be 5 or less.

The plurality of reflectors 20 may be formed of a material that reflects light. For example, the plurality of reflectors 20 may be formed of white beads. White beads may be formed of fine grains formed of titanium dioxide $TiO_2$ or silicon dioxide $SiO_2$. As another example, the plurality of reflectors 20 may be formed of white resin.

The transparent layer 30 is disposed on the upper side of the plurality of reflectors 20, and the upper side of the plurality of reflectors 20 may be formed as a flat surface by the transparent layer 30.

The transparent layer 30 may be formed of a material that transmits light. Accordingly, image light projected from the projector may pass through the transparent layer 30 and be reflected by the reflective surfaces 21 of the plurality of reflectors 20, and external light may pass through the transparent layer 30 and be absorbed by the light absorbing layer 10.

The transparent layer 30 may include a front surface 31 formed in a flat surface parallel to the light absorbing layer 10 and a rear surface 32 formed with a plurality of grooves 33 (see FIG. 6B) and attached to the light absorbing layer 10. The rear surface 32 of the transparent layer 30 may be formed parallel to the front surface 31, and the plurality of grooves 33 may be formed in a shape corresponding to the plurality of reflectors 20.

For example, when the plurality of reflectors 20 are formed in the shape of columns having a cross-section of a right triangle, the plurality of grooves 33 may be formed as grooves having a cross-section of a right triangle into which the right triangle columns are inserted. In other words, each of the plurality of grooves 33 may be formed as a groove having a right triangle shape having an inclined surface 34 and a side surface 35.

Therefore, when the plurality of reflectors 20 are inserted into the plurality of grooves 33 of the transparent layer 30, the inclined surfaces of the reflectors 20, that is, the reflective surfaces 21 and the side surfaces 23 come into close contact with the inclined surfaces 34 and the side surfaces 35 of the grooves 33 of the transparent layer 30, respectively. As such, the rear surface 32 of the transparent layer 30 comes into contact with the portions 10*a* of the light absorbing layer 10 exposed between the plurality of reflectors 20.

Therefore, the transparent layer 30 may be disposed on the front surface of the light absorbing layer 10 while covering the plurality of reflectors 20.

The transparent layer 30 may be formed of a transparent urethane resin. The plurality of grooves 33 of the transparent layer 30 may be formed using an imprinting method.

A base film 40 may be disposed on the front surface of the transparent layer 30. The base film 40 may be formed of a transparent material through which light may pass. For example, the base film 40 may be formed of a transparent polyethylene terephthalate (PET) film.

In addition, a low reflection layer 50 may be disposed on the front surface of the base film 40. The low reflection layer 50 may be formed to reduce light reflectance on the front surface 2 of the projector screen 1. Accordingly, when the low reflection layer 50 is disposed on the front surface 2 of the projector screen 1, reflection of external light felt by the viewer may be reduced.

The low reflection layer 50 may be formed of a transparent material through which light passes, and may be formed in the form of a thin film. For example, the low reflection layer 50 may be formed integrally with the base film 40.

In the projector screen 1 according to an embodiment illustrated in FIG. 3, the low reflection layer 50 is disposed on the front surface of the base film 40. However, the disclosure is not limited thereto. The low reflection layer 50 may be selectively disposed on the projector screen 1. In other words, in the projector screen 1 according to another example, the low reflection layer 50 may not be disposed on the front surface of the base film 40.

Hereinafter, a light path in the projector screen 1 according to an embodiment of the disclosure having the above-described structure will be described in detail with reference to FIG. 5.

Figure 5:
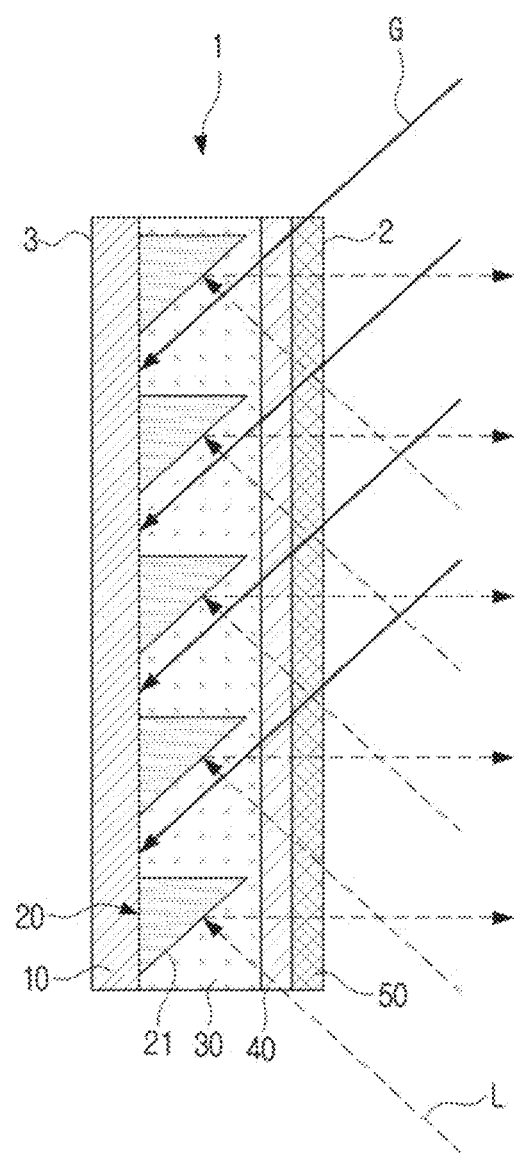
FIG. 5 is a view illustrating paths of image light and external light incident on a projector screen according to an embodiment of the disclosure.

FIG. 5 is a view illustrating paths of image light L and external light G incident on a projector screen 1 according to an embodiment of the disclosure.

Referring to FIG. 5, external light G is incident from the upper side of the projector screen 1 toward the front surface 2 of the projector screen 1. The external light G refers to light emitted from lighting disposed on the ceiling of the room.

External light G passes through the low reflection layer 50, the base film 40, and the transparent layer 30, and then enters the light absorbing layer 10. The light absorbing layer 10 is formed of a black resin film to absorb light. The external light G incident on the light absorbing layer 10 is absorbed by the light absorbing layer 10 and is not reflected to the front surface 2 of the projector screen 1.

Image light L projected from the projector 201 (see FIG. 2) disposed below the projector screen 1 is incident toward the front surface 2 of the projector screen 1.

The image light L projected from the projector 201 passes through the low reflection layer 50, the base film 40, and the transparent layer 30, and then is incident on the reflective surface 21 of each of the plurality of reflectors 20. The image light L incident on the reflective surface 21 is reflected by the reflective surface 21, passes through the transparent layer 30, the base film 40, and the low reflection layer 50, and then is emitted in a direction perpendicular to the front surface 32 of the projector screen 1, that is, the low reflection layer 50. The viewer may see the image light L reflected by the reflective surfaces 21 of the plurality of reflectors 20.

Because the projector screen 1 according to an embodiment of the disclosure having the above-described structure may lower the black level in a bright room and reflect the image light L projected from the projector 201 as much as possible, the bright-room contrast ratio may be improved. Accordingly, the image quality perceived by the viewer may be improved.

Hereinafter, a method of manufacturing the projector screen 1 according to an embodiment of the disclosure as described above will be described in detail with reference to FIG. 6A, FIG. 6B, FIG. 6C, FIG. 6D, and FIG. 6E.

FIG. 6A, FIG. 6B, FIG. 6C, FIG. 6D, and FIG. 6E are views for explaining a method of manufacturing a projector screen 1 according to an embodiment of the disclosure.

First, the base film 40 is prepared. The base film 40 may be formed of a rectangular transparent sheet having a thin thickness. The base film 40 may be formed of a transparent polyethylene terephthalate (PET) film.

Figure 6A:
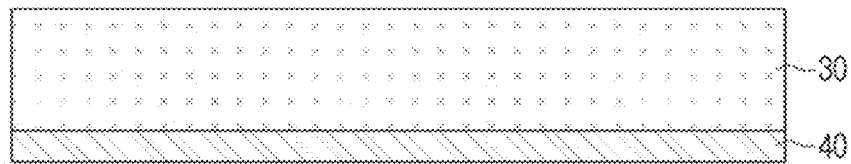
FIGS. 6A to 6E are views for explaining a method of manufacturing a projector screen according to an embodiment of the disclosure.

Next, as illustrated in FIG. 6A, a transparent layer 30 is formed on a surface of the base film 40. The transparent layer 30 may be a transparent urethane layer formed of a transparent urethane resin. The transparent layer 30 may be attached to the base film 40 so as not to be separated. In other words, the transparent layer 30 may be formed in a layered structure over the entire surface of the base film 40.

Figure 6B:
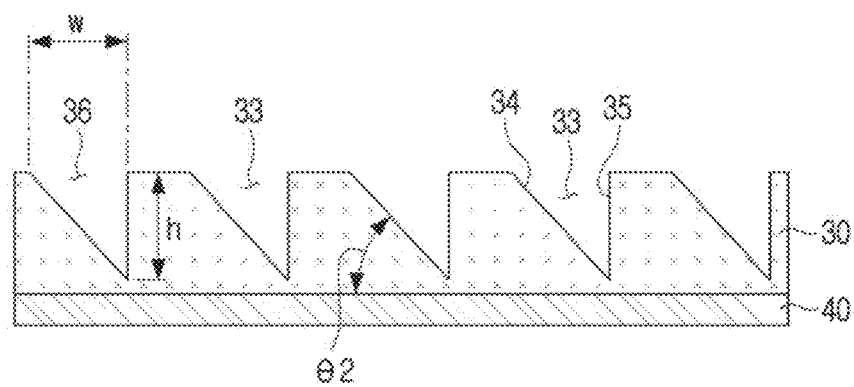

Subsequently, as illustrated in FIG. 6B, a plurality of grooves 33 are formed at regular intervals on the upper surface of the transparent layer 30. The plurality of grooves 33 may be formed to have a cross-section of a right triangle. Accordingly, the groove 33 having a right triangle shape may include a side surface 35 perpendicular to the base film 40 and an inclined surface 34 inclined at an inclination angle θ2 with respect to the base film 40.

The inclined surface 34 of the right triangular groove 33 may form an acute angle with respect to the base film 40. For example, the right triangular groove 33 may be formed such that the ratio of the width of the upper surface of the groove 33, that is, the width w of the opening 36 of the groove 33 to the height h of the groove 33, that is, the length of the side surface 34 of the groove 33 is 0.5 or more. The height h of the groove 33 and the width w of the opening of the groove 33 correspond to the height y of the reflective surface 21 and the base x of the reflective surface 21 described above, respectively.

The inclined surfaces 34 and the side surfaces 35 of the two adjacent right triangular grooves 33 may be formed to be spaced apart from each other by a predetermined distance. In other words, the inclined surfaces 34 and the side surfaces 35 of the two adjacent right triangular grooves 33 may be formed so as not to contact each other.

The plurality of right triangular grooves 33 may be formed through an imprinting process. For example, the plurality of right triangular grooves 33 may be formed on the upper surface of the transparent layer 30 using an imprinting jig in which a plurality of right triangle protrusions are arranged in parallel at regular intervals.

Figure 6C:
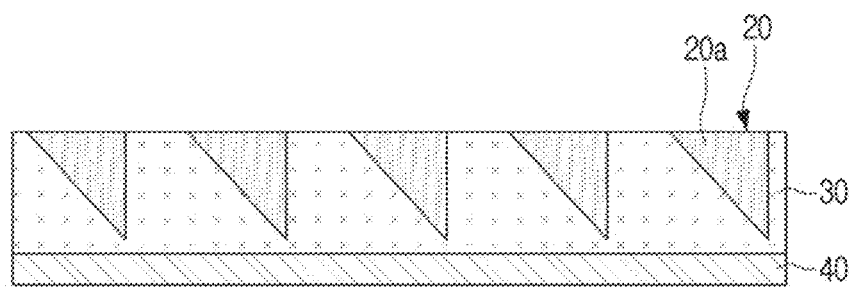

Next, as illustrated in FIG. 6C, the plurality of grooves 33 of the transparent layer 30 are filled with white beads 20a. The white beads 20a filled in the plurality of grooves 33 of the transparent layer 30 may form the reflectors 20.

The white beads 20a may be particles formed of titanium dioxide $TiO_2$ or silicon dioxide $SiO_2$. The white beads 20a may be fixed to the plurality of grooves 33 of the transparent layer 30 using a binder or the like.

As another example, the plurality of reflectors 20 may be formed by filling the plurality of grooves 33 of the transparent layer 30 with white resin. The white resin refers to a resin having a white color so as to reflect light.

Figure 6D:
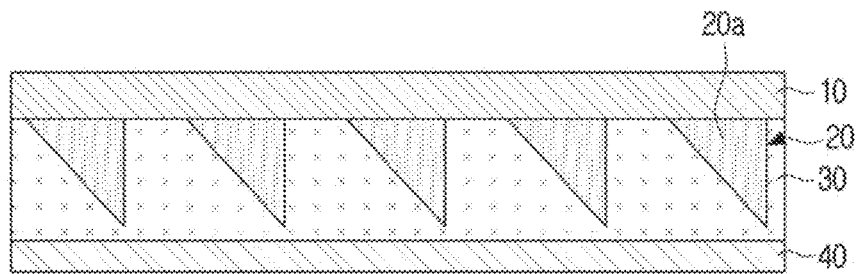

Subsequently, as illustrated in FIG. 6D, a light absorbing layer 10 is disposed on the upper surface of the transparent layer 30 in which the plurality of grooves 33 are formed. The light absorbing layer 10 may be disposed to cover the entire surface of the transparent layer 30. Accordingly, the white beads filled in the plurality of grooves 33 of the transparent layer 30, and, the reflectors 20 may also be covered by the light absorbing layer 10.

An adhesive may be applied between the upper surface of the transparent layer 30 and the light absorbing layer 10 to fix the light absorbing layer 10 to the upper surface of the transparent layer 30.

The light absorbing layer 10 may be formed of a black resin film to absorb incident light. For example, the light absorbing layer 10 may be formed of a black polyethylene terephthalate (PET) film. The light absorbing layer 10 forms the rear surface 3 of the projector screen 1.

Figure 6E:
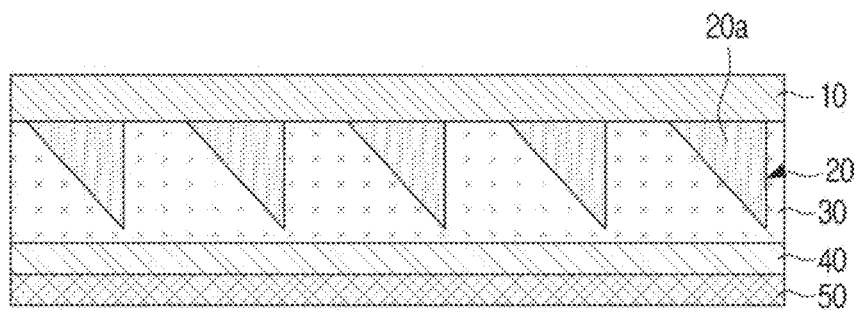

Finally, as illustrated in FIG. 6E, a low reflection layer 50 is formed on the lower surface of the base film 40. In other words, the low reflection layer 50 may be formed on the other surface of the base film 40 on which the transparent layer 30 is not formed.

In this embodiment, the low reflection layer 50 is formed on the lower surface of the base film 40 in the final operation, but the disclosure is not limited thereto. As another embodiment, when preparing the base film 40 as the first operation, the low reflection layer 50 may be formed on a surface of the base film 40.

In the above, the case where the projector screen 1 includes the low reflection layer 50 has been described. However, the projector screen 1 may not include the low reflection layer 50. In this case, the operation of forming the low reflection layer 50 on the lower surface of the base film 40 described above is not required.

As described above, according to the method of manufacturing the projector screen 1 according to an embodiment of the disclosure, unlike screens according to the related art, it is not necessary to form the reflective surfaces in fine triangular patterns by sputtering or by coating white ink, so manufacturing costs may be reduced.

In another embodiment, a color absorption layer 60 may be disposed on the projector screen 1. For example, as illustrated in FIG. 7, the color absorption layer 60 may be provided on the front surface of the low reflection layer 50 of the projector screen 1.

Figure 7:
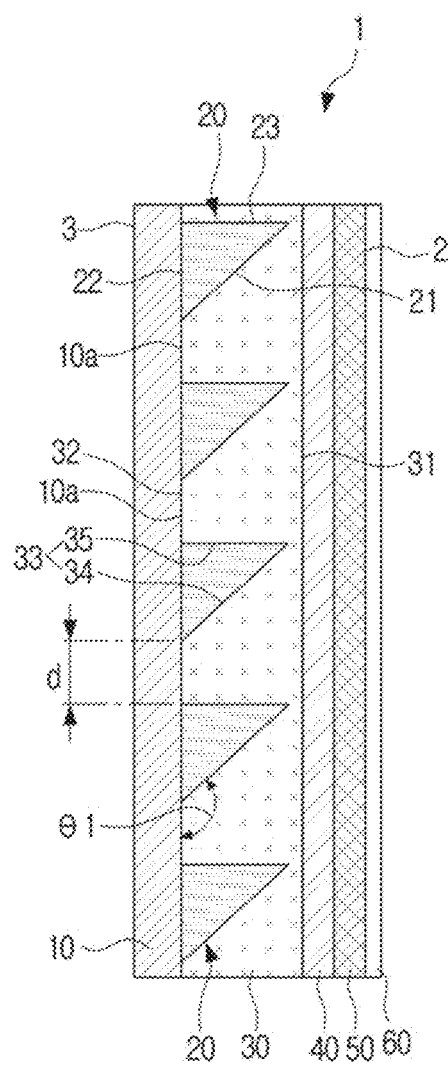
FIG. 7 is a cross-sectional view illustrating a projector screen according to an embodiment of the disclosure.

FIG. 7 is a cross-sectional view illustrating a projector screen 1 according to an embodiment of the disclosure.

An absorption layer 10, a plurality of reflectors 20, a transparent layer 30, a base film 40, and a low reflection layer 50 of the projector screen 1 according to the embodiment illustrated in FIG. 7 are the same as those of the projector screen 1 as illustrated in FIG. 3; therefore, detailed descriptions thereof are omitted.

The color absorption layer 60 may be formed over the entire front surface of the low reflection layer 50 to have a predetermined thickness on the front surface of the low reflection layer 50.

The color absorption layer 60 may be formed to absorb light having a predetermined wavelength. The color absorption layer 60 may be formed using a color absorbing dye. For example, the color absorbing dye may be formed of Tetra-Aza-Porphyrin (TAP). The color absorbing dye may be formed to absorb a specific color light among various color lights included in light. In other words, the color absorbing dye may be formed to absorb light having a specific range of wavelengths among visible light.

Figure 8:
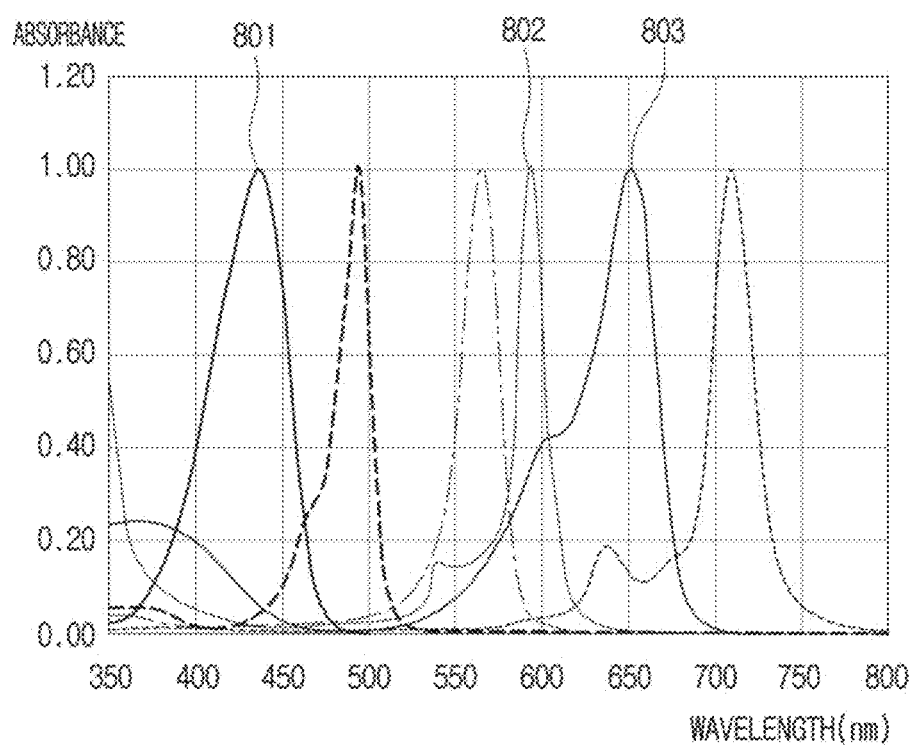
FIG. 8 is a graph illustrating absorption spectra according to wavelength bands of light.

FIG. 8 is a graph illustrating an absorption spectrum for each wavelength band of light. In FIG. 8, the horizontal axis represents the wavelength (nm) of light, and the vertical axis represents absorbance.

FIG. 8 shows a case in which six wavelength bands, that is, six color lights, are absorbed using six color absorbing dyes. For example, in FIG. 8, the curve 801 represents a case where blue light is absorbed by a color absorbing dye capable of absorbing blue light, the curve 802 represents a case where yellow light is absorbed by a color absorbing dye capable of absorbing yellow light, and the curve 803 represents a case where orange light is absorbed by a color absorbing dye capable of absorbing orange light.

The color absorption layer 60 of the projector screen 1 according to this embodiment may be formed of a color absorbing dye capable of absorbing yellow light. Then, the yellow light included in the external light incident on the projector screen 1 may be absorbed. A result that the projector screen 1 including the color absorption layer 60 as illustrated in FIG. 7 absorbs the yellow light of the incident external light is shown in FIG. 9.

Figure 9:
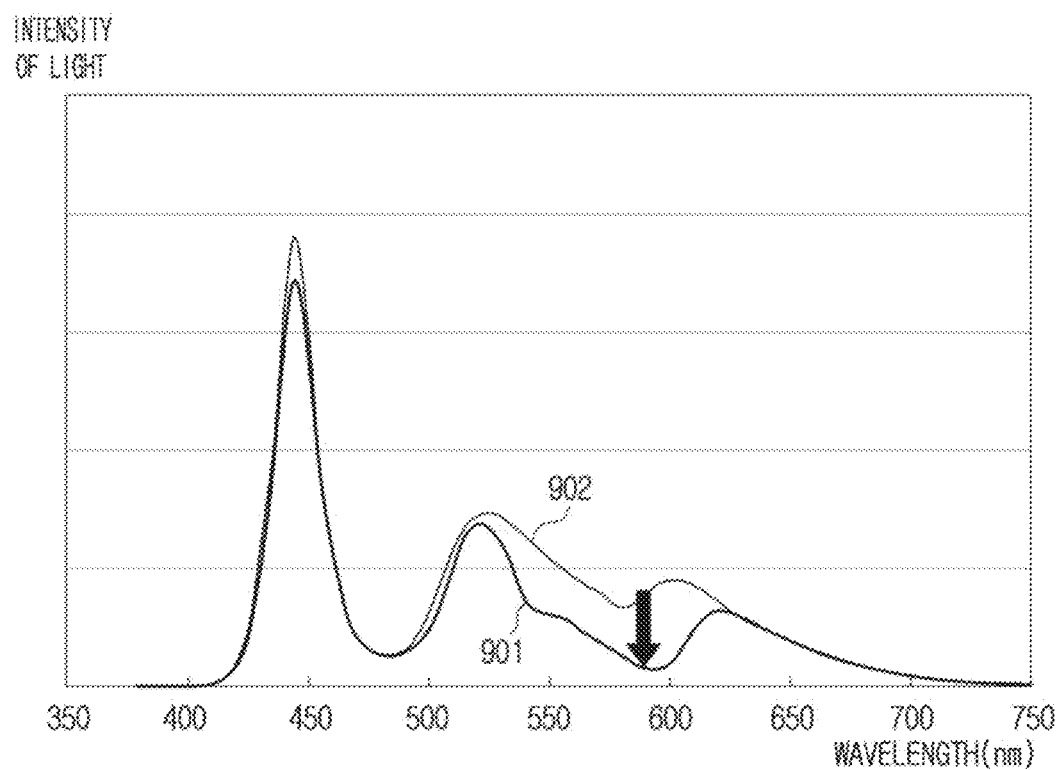
FIG. 9 is a graph comparing light intensity of a projector screen including a color absorbing layer capable of absorbing yellow light and light intensity of a projector screen without a color absorbing layer.

FIG. 9 is a graph comparing light intensity of a projector screen 1 including a color absorbing layer 60 capable of absorbing yellow light and light intensity of a projector screen 1 without a color absorbing layer 60. In FIG. 9, the horizontal axis represents the wavelength (nm) of external light, and the vertical axis represents the intensity of light.

In FIG. 9, the curve 901 represents the intensity of light measured on the projector screen 1 including the color absorption layer 60 capable of absorbing yellow light, and the curve 902 represents the intensity of light measured on the projector screen 1 without the color absorption layer 60.

Referring to FIG. 9, the intensity of external light decreases in a wavelength region of 590 nm (arrow) corresponding to yellow light. When yellow light of external light is absorbed using the color absorption layer 60 in this way, the contrast ratio in a bright room condition may be improved.

Figure 10:
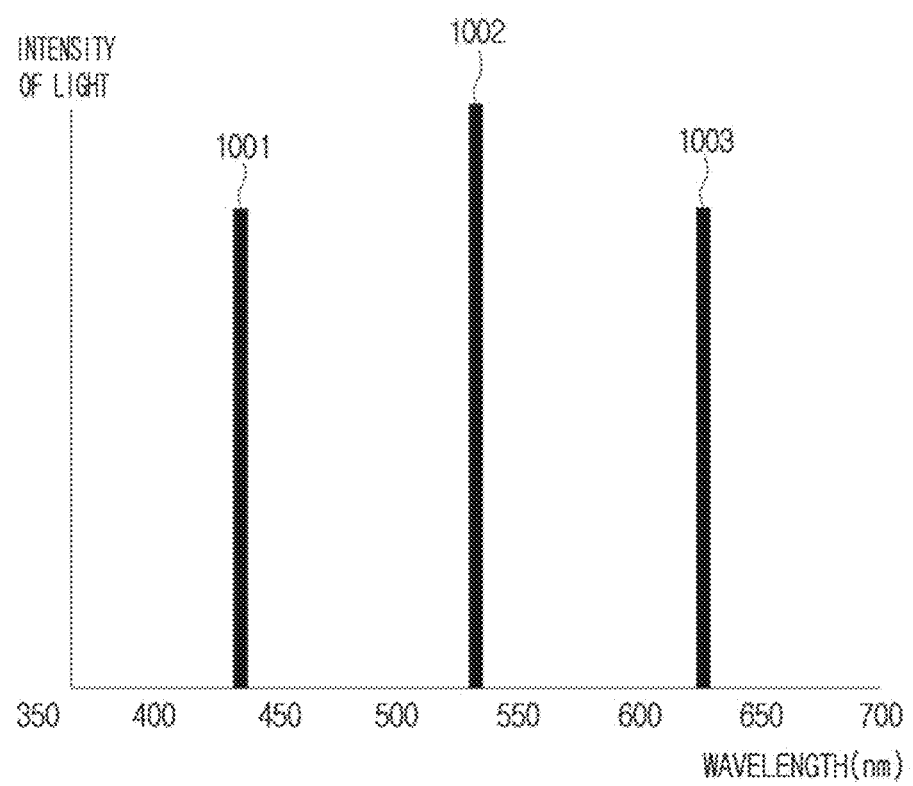
FIG. 10 is a graph illustrating a spectrum of image light projected from a projector.

In this case, because the projector 201 emits red light, green light, and blue light as illustrated in FIG. 10, there is no interference with the color absorption layer 60 of the projector screen 1 that absorbs yellow light.

FIG. 10 is a graph illustrating a spectrum of image light projected from a projector 201. In FIG. 10, the horizontal axis represents the wavelength (nm) of light, and the vertical axis represents the intensity of light. Further, in FIG. 10, the straight line 1001 represents blue light emitted from the projector 201, the straight line 1002 represents green light emitted from the projector 201, and the straight line 1003 represents red light emitted from the projector 201.

Referring to FIG. 10, the projector 201 emits blue light, green light, and red light, and does not emit the wavelength of yellow light (about 590 nm) absorbed by the color absorption layer 60 of the projector screen 1, so that the image light L emitted from the projector 201 is not absorbed by the color absorption layer 60.

Hereinafter, a projector screen 1' according to another embodiment of the disclosure will be described in detail with reference to FIG. 11 and FIG. 12.

Figure 11:
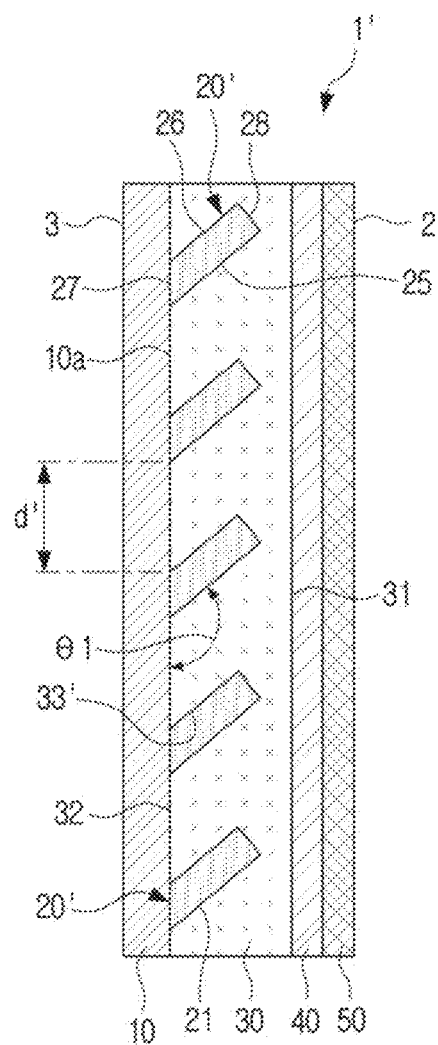
FIG. 11 is a cross-sectional view illustrating a projector screen according to an embodiment of the disclosure.

FIG. 11 is a cross-sectional view illustrating a projector screen 1' according to an embodiment of the disclosure. FIG. 12 is a partially enlarged cross-sectional view illustrating a reflector, of reflectors 20', of a projector screen 1' according to an embodiment of the disclosure.

Referring to FIG. 11, the projector screen 1' according to an embodiment of the disclosure may include a light absorbing layer 10, a plurality of reflectors 20', and a transparent layer 30.

The light absorbing layer 10 is a layer that absorbs incident light. A black resin film may be used as the light absorbing layer 10. For example, a black polyethylene terephthalate (PET) film may be used as the light absorbing layer 10.

The plurality of reflectors 20' may be formed to reflect incident light toward the user. For example, the plurality of reflectors 20' may be formed to reflect light incident from the lower side in a direction perpendicular to the front surface 2 of the projector screen 1'. Here, the lower side refers to a place lower than the center in the vertical direction of the projector screen 1'.

The plurality of reflectors 20' may be disposed on the front surface of the light absorbing layer 10 at regular intervals. In other words, the plurality of reflectors 20' are disposed to be spaced apart from each other at regular intervals in the vertical direction of the projector screen 1', and the light absorbing layer 10 may be exposed between the plurality of reflectors 20'. At this time, the distance d' between the plurality of reflectors 20', that is, the distance between two adjacent reflectors 20' may be determined such that image light incident from the projector 201 is reflected by the reflectors 20' without being directly incident on the exposed portions 10a of the light absorbing layer 10.

In addition, the plurality of reflectors 20' may be formed to be inclined at a predetermined angle with respect to the light absorbing layer 10. In other words, the plurality of reflectors 20' may be formed such that the reflective surface 21 that reflects light is inclined at an inclination angle $\theta 1$ with respect to the light absorbing layer 10. At this time, the inclination angle $\theta 1$ of the reflective surface 21 may be determined to reflect the light incident from the lower side in a direction perpendicular to the front surface 2 of the projector screen 1'.

For example, each of plurality of reflectors 20' may be formed in a flat plate shape having a trapezoidal cross-section. The inclined surface of the reflector 20' forms the reflective surface 21 that reflects image light projected from the projector 201, and one surface 27 of the reflector 20' may be fixed to the light absorbing layer 10. The reflective surface 21 may be formed to be inclined upward with respect to the light absorbing layer 10. In other words, the reflective surface 21 may be formed to form an obtuse angle with respect to the light absorbing layer 10.

As illustrated in FIG. 11, when the cross-section of the reflector 20' is formed in a trapezoid, the reflector 20' may include two inclined surfaces, lower inclined surface 25 and inclined surface 26, parallel to each other and inclined with respect to the light absorbing layer 10, and a front surface 28 and a rear surface 27 connecting the front and rear ends of the two inclined surfaces, lower inclined surface 25 and inclined surface 26. Among the two inclined surfaces, lower inclined surface 25 and inclined surface 26, parallel to each other, the lower inclined surface 25 forms the reflective surface 21 that reflects image light projected from the projector 201. The rear surface 27 of the reflector 20' forming the side of the trapezoid may contact the light absorbing layer 10.

The amount of light reflection that the reflective surfaces 21 of the plurality of reflectors 20' reflect image light incident from the lower side to the front may vary according to the inclination of the reflective surfaces 21. In this case, when the ratio of the base of the reflective surface 21 to the height of the reflective surface 21 is 0.5 or more, an appropriate amount of light reflection may be obtained.

Figure 12:
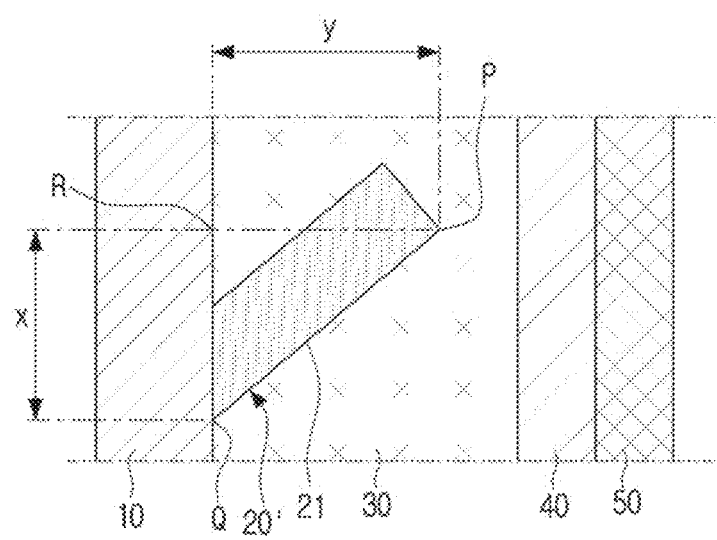
FIG. 12 is a partially enlarged cross-sectional view illustrating a reflector of a projector screen according to an embodiment of the disclosure.

Referring to FIG. 12, the height y of the reflective surface 21 refers to the height from the light absorbing layer 10 to the highest point P of the reflective surface 21, and the base x of the reflective surface 21 refers to the distance from the lower end Q of the reflective surface 21 in contact with the light absorbing layer 10 to a point R at which an imaginary straight line drawn perpendicular to the light absorbing layer 10 from the highest point P of the reflective surface 21 intersects the light absorbing layer 10.

Accordingly, the reflective surface 21 of the reflector 20' may have an ideal optical structure when $x/y \geq 0.5$.

On the other hand, the ratio of the base x of the reflective surface 21 to the height y of the reflective surface 21 may be 5 or less.

The plurality of reflectors 20' may be formed of a material that reflects light. For example, the plurality of reflectors 20' may be formed of white beads. White beads may be formed of fine grains formed of titanium dioxide $TiO_2$ or silicon dioxide $SiO_2$. Alternatively, the plurality of reflectors 20' may be formed of white resin.

The transparent layer 30 is disposed on the upper side of the plurality of reflectors 20', and the upper side of the plurality of reflectors 20' may be formed as a flat surface by the transparent layer 30. The transparent layer 30 may be formed of a material that transmits light. Accordingly, image light may pass through the transparent layer 30 and be reflected by the reflective surfaces 21 of the plurality of reflectors 20', and external light may pass through the transparent layer 30 and be absorbed by the light absorbing layer 10.

The transparent layer 30 may include a front surface 31 formed in a flat surface parallel to the light absorbing layer 10 and a rear surface 32 formed with a plurality of grooves 33' and attached to the light absorbing layer 10. The rear surface 32 of the transparent layer 30 may be formed parallel to the front surface 31, and the plurality of grooves 33' may be formed in a shape corresponding to the plurality of reflectors 20'.

For example, when the plurality of reflectors 20' are formed in a flat plate having a trapezoidal cross-section, the plurality of grooves 33' may be formed as grooves having a trapezoidal cross-section into which the flat plate having the trapezoidal cross-section is inserted. In other words, each of the plurality of grooves 33' may be formed as a trapezoid-shaped groove having two inclined surfaces, inclined surface 27 and inclined surface 38, inclined with respect to the rear surface 32 of the transparent layer 30 and parallel to each other and a bottom surface 39 connecting lower ends of the two inclined surfaces, inclined surface 27 and inclined surface 38.

Therefore, when the plurality of reflectors 20' are inserted into the plurality of grooves 33' of the transparent layer 30, the two inclined surfaces, lower inclined surface 25 and inclined surface 26, and the front surface 28 of the reflectors 20' come into close contact with the two inclined surfaces, inclined surface 37 and inclined surface 38, and the bottom surface 39 of the grooves 33' of the transparent layer 30, respectively. At this time, the rear surface 32 of the transparent layer 30 comes into contact with the light absorbing layer 10.

Therefore, the transparent layer 30 may be disposed on the upper surface of the light absorbing layer 10 while covering the plurality of reflectors 20'.

The transparent layer 30 may be formed of a transparent urethane resin. The plurality of grooves 33' of the transparent layer 30 may be formed using an imprinting process and a roller plastic process.

A base film 40 may be disposed on the front surface 31 of the transparent layer 30. The base film 40 may be formed of a transparent material through which light may pass. For example, the base film 40 may be formed of a transparent polyethylene terephthalate (PET) film.

In addition, a low reflection layer 50 may be disposed on the front surface of the base film 40. The low reflection layer 50 may be formed to reduce the reflectance of light on the front surface 2 of the projector screen 1'. Accordingly, when the low reflection layer 50 is disposed on the front surface 2 of the projector screen 1', reflection of external light felt by the viewer may be reduced.

The low reflection layer 50 may be formed of a transparent material through which light passes, and may be formed in the form of a thin film. For example, the low reflection layer 50 may be formed integrally with the base film 40.

In the projector screen 1' according to an embodiment illustrated in FIG. 11, the low reflection layer 50 is disposed on the front surface of the base film 40. However, the structure of the projector screen 1' is not limited thereto. The projector screen 1' according to the embodiments may optionally include the low reflection layer 50. In other words, in the projector screen 1' according to another example, the low reflection layer 50 may not be disposed on the front surface of the base film 40.

Hereinafter, a light path in the projector screen 1' according to an embodiment of the disclosure having the above-described structure will be described in detail.

Figure 13:
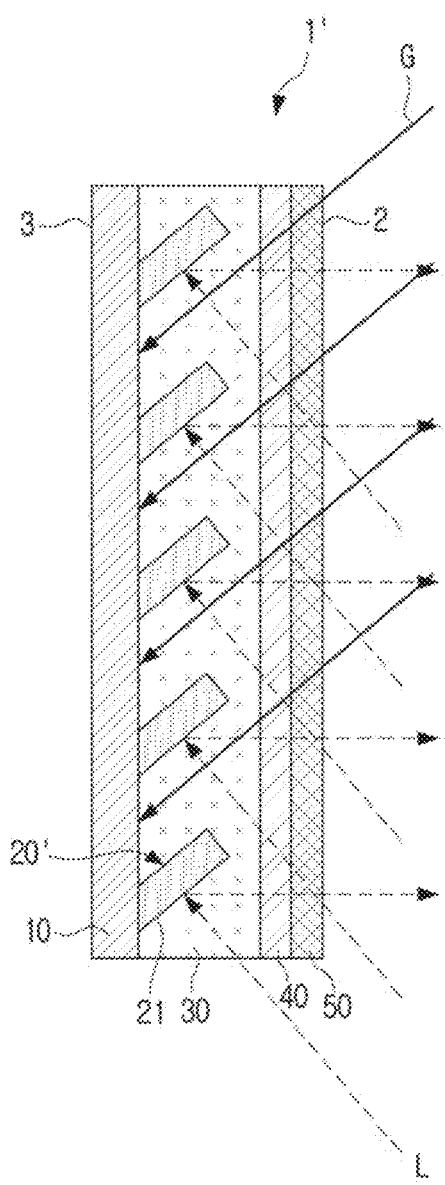
FIG. 13 is a view illustrating paths of image light and external light incident on a projector screen according to an embodiment of the disclosure.

FIG. 13 is a view illustrating light paths of image light and external light incident on a projector screen according to an embodiment of the disclosure.

Referring to FIG. 13, external light is incident from the upper side of the projector screen 1' toward the front surface 2 of the projector screen 1'.

External light passes through the low reflection layer 50, the base film 40, and the transparent layer 30, and then enters the light absorbing layer 10. The light absorbing layer 10 is formed of a black resin film to absorb light. Therefore, the external light incident on the light absorbing layer 10 is absorbed by the light absorbing layer 10 and is not reflected to the front surface 2.

Image light L projected from the projector 201 (see FIG. 2) disposed below the projector screen 1' is incident toward the front surface 2 of the projector screen 1'.

The image light L projected from the projector 201 passes through the low reflection layer 50, the base film 40, and the transparent layer 30, and then is incident on the reflective surface 21 of each of the plurality of reflectors 20'. The image light L incident on the reflective surface 21 is reflected by the reflective surface 21, passes through the transparent layer 30, the base film 40, and the low reflection layer 50, and then is emitted in a direction perpendicular to the front surface 2 of the projector screen 1', that is, the low reflection layer 50. The viewer may see the image light L reflected by the reflective surfaces 21 of the plurality of reflectors 20'.

Because the projector screen 1' according to an embodiment of the disclosure having the above-described structure may lower the black level in a bright room and maximally reflect the image light L projected from the projector 201, the bright-room contrast ratio may be improved. Accordingly, the image quality perceived by the viewer may be improved.

Hereinafter, a method of manufacturing the projector screen 1' according to an embodiment of the disclosure as described above will be described in detail with reference to FIG. 14A, FIG. 14B, FIG. 14C, FIG. 14D, FIG. 14E, and FIG. 14F.

FIG. 14A, FIG. 14B, FIG. 14C, FIG. 14D, FIG. 14E, and FIG. 14F are views for explaining a method of manufacturing a projector screen 1' according to an embodiment of the disclosure.

First, the base film 40 is prepared. The base film 40 may be formed of a rectangular transparent sheet having a thin thickness. The base film 40 may be formed of a transparent polyethylene terephthalate (PET) film.

Figure 14A:
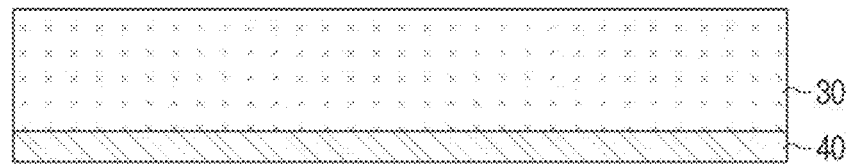
FIGS. 14A to 14F are views for explaining a method of manufacturing a projector screen according to an embodiment of the disclosure.

Next, as illustrated in FIG. 14A, a transparent layer 30 is formed on a surface of the base film 40. The transparent layer 30 may be a transparent urethane layer formed of a transparent urethane resin. The urethane layer 30 may be attached to the base film 40 so as not to be separated. In other words, the base film 40 and the transparent layer 30 may form a layered structure. In addition, the transparent layer 30 may be formed with the same area as the base film 40.

Figure 14B:
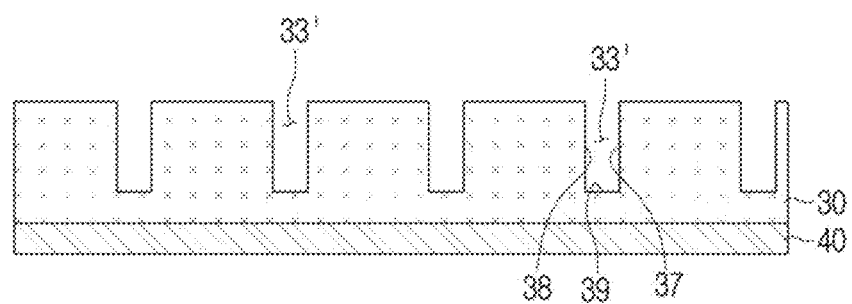

Subsequently, as illustrated in FIG. 14B, a plurality of grooves 33' are formed at regular intervals from each other on the upper surface of the transparent layer 30. The plurality of grooves 33' may be formed to have a rectangular cross-section. The plurality of rectangular shaped grooves 33' may be formed perpendicular to the base film 40. At this time, each of the plurality of grooves 33' having a rectangular cross section may be formed to have a depth greater than a width.

The plurality of grooves 33' having a rectangular cross-section may be formed through an imprinting process. For example, the plurality of grooves 33' having a rectangular shape may be formed on the upper surface of the transparent layer 30 using an imprinting jig in which a plurality of protrusions having a rectangular cross section are arranged in parallel at regular intervals.

Figure 14C:
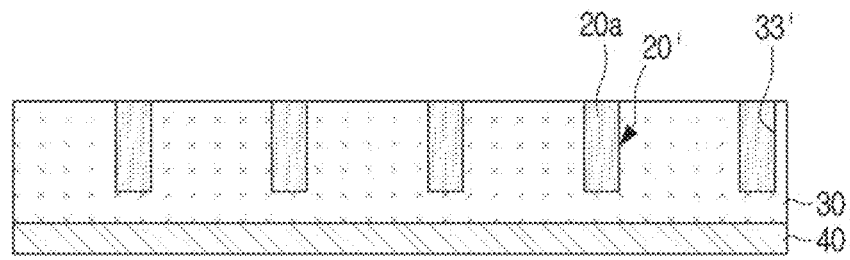

Next, as illustrated in FIG. 14C, the plurality of grooves 33' of the transparent layer 30 are filled with white beads 20a. The white beads 20a filled in the plurality of grooves 33' of the transparent layer 30 may form the reflectors 20'.

The white beads 20a may be grains formed of titanium dioxide $TiO_2$ or silicon dioxide $SiO_2$. The white beads 20a may be fixed to the plurality of grooves 33' of the transparent layer 30 using a binder or the like.

As another example, the plurality of reflectors 20' may be formed by filling the plurality of grooves 33' of the transparent layer 30 with a white resin. The white resin refers to a resin having a white color so as to reflect light.

Figure 14D:
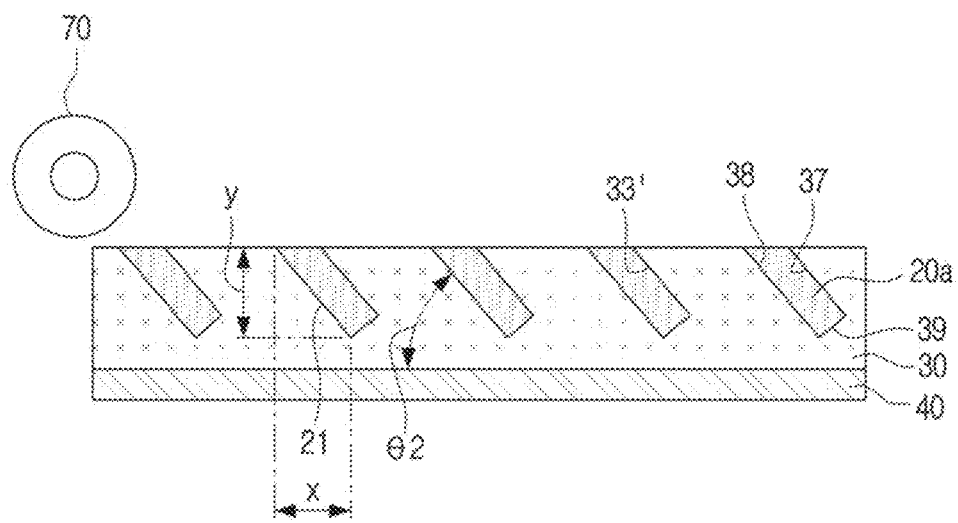

Subsequently, as illustrated in FIG. 14D, the transparent layer 30 is molded by using a roller 70 so that the plurality of grooves 33' having a rectangular cross-section of the transparent layer 30 are inclined at an inclination angle θ2 with respect to the base film 40.

The transparent layer 30 is formed of a transparent urethane resin having a soft property. Therefore, when the base film 40 to which the lower surface of the transparent layer 30 is fixed is fixed and the upper end of the transparent layer 30 is pressed in one direction using the roller 70, the upper end of the transparent layer 30 moves a certain distance relative to the lower end, so that the transparent layer 30 is transformed. At this time, the plurality of grooves 33' having a rectangular cross-section are inclined at an inclination angle θ2 with respect to the base film 40. When the transparent layer 30 is cured in this state, the plurality of grooves 33' having a rectangular cross-section may maintain an inclined state with respect to the base film 40.

In this case, because the reflectors 20' filled with the white beads 20a are formed in the plurality of grooves 33' having a rectangular cross-section, the reflectors 20' are inclined at a predetermined angle with respect to the base film 40. The reflectors 20' of the molded transparent layer 30 may form an acute angle θ2 with respect to the base film 40.

In addition, in the operation of forming the transparent layer 30 to be inclined, the groove 33' having a rectangular cross-section may be molded such that the ratio of the base x of an inclined side to the height y of the inclined side is 0.5 or more. When the transparent layer 30 is molded in this way, the ratio of the base x of the reflective surface 21 to the height y of the reflective surface 21 in the reflectors 20' formed in the grooves 33' having a rectangular cross-section may be greater than 0.5.

Figure 14E:
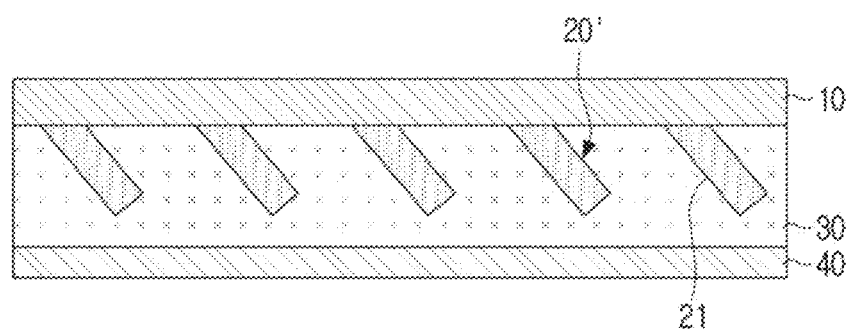

Next, as illustrated in FIG. 14E, a light absorbing layer 10 is disposed on the upper surface of the transparent layer 30 in which the plurality of reflectors 20' are formed.

An adhesive may be applied between the upper surface of the transparent layer 30 and the light absorbing layer 10 to fix the light absorbing layer 10 to the upper surface of the transparent layer 30. After the above-described molding process of the transparent layer 30 is completed, when the upper surface of the transparent layer 30 is not flat, the light absorbing layer 10 may be attached to the upper surface of the transparent layer 30 by using an adhesive.

The light absorbing layer 10 may be formed of a black resin film to absorb incident light. For example, the light absorbing layer 10 may be formed of a black polyethylene terephthalate (PET) film. The light absorbing layer 10 forms the rear surface 3 of the projector screen 1'.

Figure 14F:
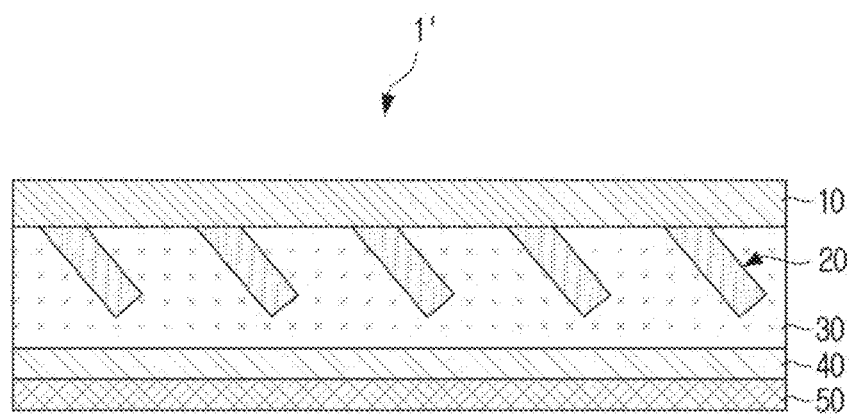

Finally, as illustrated in FIG. 14F, a low reflection layer 50 is formed on the lower surface of the base film 40. In other words, the low reflection layer 50 may be formed on the other surface of the base film 40 on which the transparent layer 30 is not formed.

In this embodiment, the low reflection layer 50 is formed on the lower surface of the base film 40 in the final operation, but the disclosure is not limited thereto. As another embodiment, when preparing the base film 40 as the first operation, the low reflection layer 50 may be formed on a surface of the base film 40.

In the above, the case where the projector screen 1' includes the low reflection layer 50 has been described. However, the projector screen 1' may not include the low reflection layer 50. In this case, the operation of forming the low reflection layer 50 on the lower surface of the base film 40 described above is not required according to an embodiment.

As described above, according to the method of manufacturing the projector screen 1' according to an embodiment of the disclosure, unlike screens according to the related art, it is not necessary to form the reflective surfaces in fine triangular patterns by sputtering or by coating white ink, so manufacturing costs may be reduced.

In another embodiment, a color absorption layer 60 may be disposed on the projector screen 1'. For example, as illustrated in FIG. 15, the color absorption layer 60 may be provided on the front surface of the low reflection layer 50 of the projector screen 1'.

Figure 15:
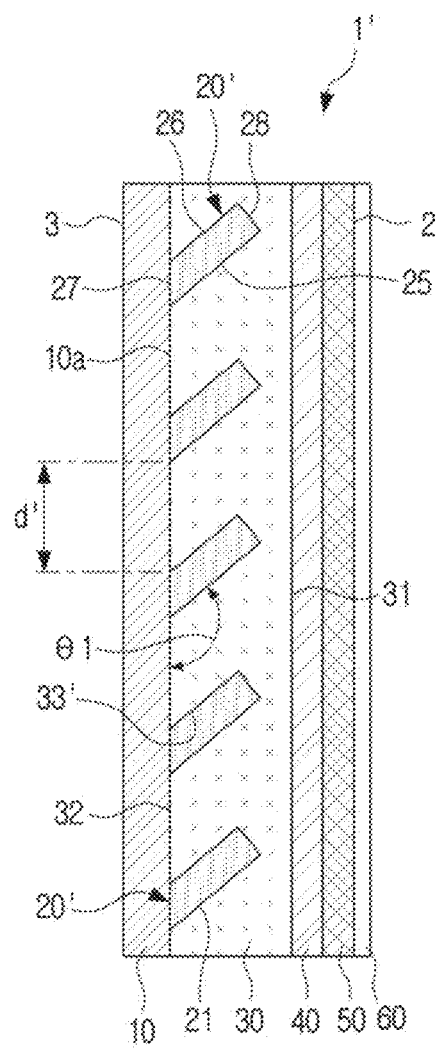
FIG. 15 is a cross-sectional view illustrating a projector screen according to an embodiment of the disclosure.

FIG. 15 is a cross-sectional view illustrating a projector screen according to an embodiment of the disclosure.

An absorption layer 10, a plurality of reflectors 20', a transparent layer 30, a base film 40, and a low reflection layer 50 of the projector screen 1' according to the embodiment illustrated in FIG. 15 are the same as those of the projector screen 1' as illustrated in FIG. 11; therefore, detailed descriptions thereof are omitted.

The color absorption layer 60 may be formed over the entire front surface of the low reflection layer 50 to have a predetermined thickness on the front surface of the low reflection layer 50.

The color absorption layer 60 may be formed to absorb light having a predetermined wavelength. The color absorption layer 60 is the same as the color absorption layer 60 of the projector screen 1 shown in FIG. 7; therefore, a detailed description thereof is omitted.

According to one or more embodiments, a projector screen having the above structure may lower a black level in a bright room and reflect image light projected from a projector as much as possible, the bright-room contrast ratio is improved. Accordingly, an image quality perceived by the viewer may be improved.

The embodiments of disclosure described above are examples. The terms used herein are for the purpose of description and should not be construed in a limiting sense. Various modifications and variations of the disclosure are possible according to the above contents. Accordingly, unless otherwise stated, the disclosure may be practiced freely within the scope of the claims.

What is claimed is:

1. A projector screen comprising:
    a light absorbing layer configured to absorb light;
    a plurality of reflectors provided on a front surface of the light absorbing layer and spaced apart from each other at regular intervals, wherein the plurality of reflectors are inclined with respect to the light absorbing layer and are configured to reflect light; and
    a transparent layer disposed above the plurality of reflectors and configured to transmit light therethrough, wherein the transparent layer comprises a front surface that is flat and parallel to the light absorbing layer, and a rear surface having a plurality of grooves having a shape corresponding to the plurality of reflectors,
    wherein the plurality of reflectors are provided in the plurality of grooves of the transparent layer, and the rear surface of the transparent layer contacts the front surface of the light absorbing layer.

2. The projector screen of claim 1, wherein a cross-section of each reflector of the plurality of reflectors has a shape of a right triangle, and
    wherein each reflector of the plurality of reflectors comprises a rear surface that contacts the light absorbing layer and is a base of the shape of the right triangle.

3. The projector screen of claim 1, wherein a cross-section of each reflector of the plurality of reflectors has a shape of a trapezoid, and
    wherein each reflector of the plurality of reflectors comprises a rear surface that contacts the light absorbing layer and is a side of the shape of the trapezoid.

4. The projector screen of claim 1, wherein each reflector of the plurality of reflectors comprises a reflective surface inclined with respect to the light absorbing layer and configured to reflect light, and
    wherein a ratio of a base of the reflective surface to a height of the reflective surface is at least 0.5.

5. The projector screen of claim 1, wherein the plurality of reflectors comprise white beads.

6. The projector screen of claim 1, wherein the transparent layer comprises a transparent urethane resin.

7. The projector screen of claim 1, further comprising:
    a base film that is disposed on the front surface of the transparent layer and is transparent.

8. The projector screen of claim 7, further comprising:
    a low reflection layer disposed on a front surface of the base film.

9. The projector screen of claim 8, further comprising:
    a color absorption layer disposed on a front surface of the low reflection layer.

10. The projector screen according to claim 1, wherein the front surface of the transparent layer is parallel to the flat surface of the light absorbing layer and separate from all of the plurality of reflectors.

11. The projector screen according to claim 1, wherein the front surface of the light absorbing layer is a flat surface that is in contact with the rear surface of the transparent layer and each of the plurality of reflectors.

12. The projector screen according to claim 11, wherein each reflector of the plurality of reflectors comprises a reflective surface inclined with respect to the light absorbing layer and configured to reflect light, and wherein a ratio of a base of the reflective surface to a height of the reflective surface is at least 0.5.

13. A method of manufacturing a projector screen, the method comprising:
   forming a transparent layer on a first surface of a base film;
   forming a plurality of grooves on an upper surface of the transparent layer, wherein each groove of the plurality of grooves has a right triangle cross-section and the plurality of grooves are spaced apart from each other at regular intervals;
   filling the plurality of grooves with at least one of white beads or white resin; and
   disposing a light absorbing layer on the upper surface of the transparent layer in which the plurality of grooves are formed.

14. The method of claim 13, wherein each groove of the plurality of grooves has a ratio of an opening width to a height is at least 0.5.

15. The method of claim 13, wherein the forming the plurality of grooves on the upper surface of the transparent layer comprises forming the plurality of grooves on the upper surface of the transparent layer by performing an imprinting process.

16. The method of claim 13, further comprising:
   forming a low reflection layer on a second surface of the base film that is different than the first surface; and
   forming a color absorption layer on a surface of the low reflection layer that does not contact with the base film.

17. A method of manufacturing a projector screen, the method comprising:
   forming a transparent layer on a surface of a base film;
   forming a plurality of grooves on an upper surface of the transparent layer, wherein each groove of the plurality of grooves has a rectangular cross-section and the plurality of grooves are spaced apart from each other at regular intervals;
   filling the plurality of grooves with white beads;
   molding the transparent layer by using a roller such that the plurality of grooves filled with the white beads are inclined with respect to the base film; and
   disposing a light absorbing layer on the upper surface of the transparent layer molded by the roller.

18. The method of claim 17, wherein each groove of the plurality of grooves having a rectangular cross-section inclined in the molding the transparent layer is formed so that a ratio of a base of an inclined side to a height of the inclined side is at least 0.5.

* * * * *